Dec. 26, 1961  VAN BUREN CONES  3,015,078
SELF-TRIGGERED SAWTOOTH VOLTAGE WAVE GENERATOR
Filed March 30, 1959
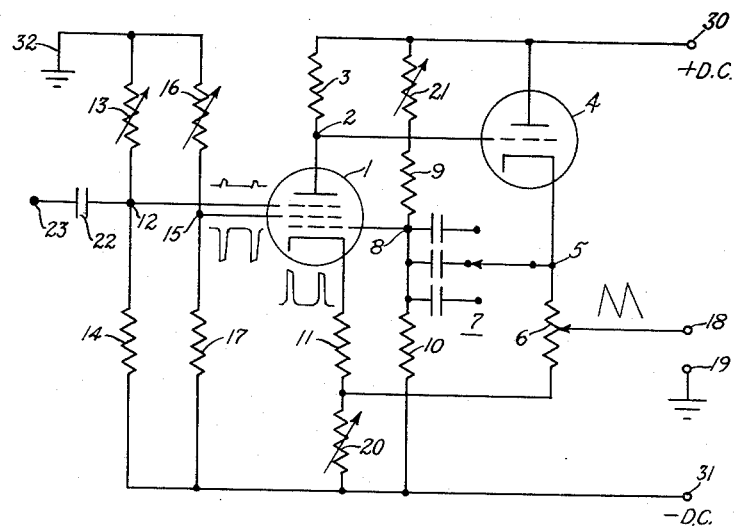
FIG. I
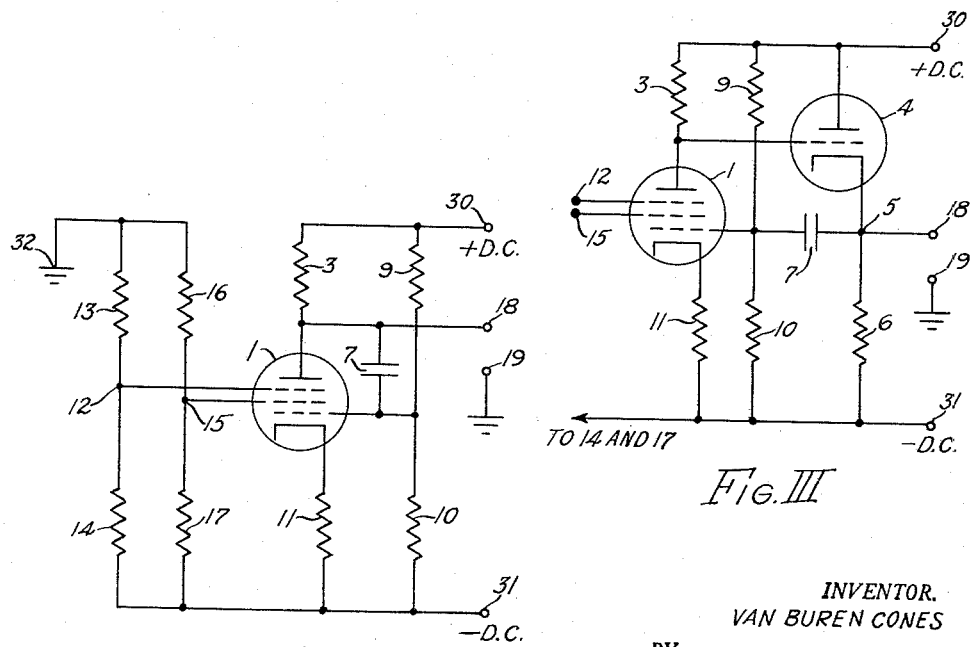
FIG. II
FIG. III
INVENTOR.
VAN BUREN CONES
BY
ATTORNEYS

United States Patent Office 3,015,078
Patented Dec. 26, 1961

3,015,078
SELF-TRIGGERED SAWTOOTH VOLTAGE
WAVE GENERATOR
Van Buren Cones, 5868 E. 42nd St., Indianapolis, Ind.
Filed Mar. 30, 1959, Ser. No. 803,041
1 Claim. (Cl. 331—152)
(Granted under Title 35, U.S. Code (1952), sec. 266)

The invention described herein may be manufactured and used by or for the Government of the United States of America for governmental purposes without the payment of any royalties thereon or therefor.

This invention relates to sawtooth voltage wave generator means and more particularly to a novel self-triggered sawtooth voltage wave generator with a very high degree of linearity and stability in repetition utilizing a pentode sawtooth voltage wave generator circuit to trigger itself without the addition of parts which have been described as essential for self-triggering functions of pentodes in the past.

The well-known Miller integrator circuit uses a vacuum tube with negative feedback from its anode to control grid through a capacitor which may be in series with other parts to generate a negative going sawtooth voltage wave between its anode and ground. For circuits using pentodes, the control grid may be coupled to a voltage divider between a positive voltage direct-current (D.C.) source and a negative voltage D.C. source. The screen and suppressor grids may each be coupled to separate voltage dividers between ground and the same negative voltage. The cathode may be coupled to the negative voltage through a resistor, and the anode may be coupled to a positive voltage through a resistor.

The present invention which incorporates a pentode having connections similar to those mentioned above, is an extremely linear and dependable sawtooth voltage wave generating circuit for the few parts it requires, which has precise timing for repetition and is self-triggering without need for such additional parts as diodes, gating tubes, capacitors and other items. This is accomplished by the proper selection of resistance values for each of the voltage dividers for each grid of the pentode. For most applications of the invention, the sawtooth voltage wave generated between the anode of the pentode and ground is coupled to a triode vacuum tube cathode follower for the output device. This arrangement furnishes a low impedance source for the wave and increases its power output, shortens the time for anode voltage rise after cutoff of anode current of the pentode to start the following negatively going sawtooth voltage, and makes a convenient source for negative feedback voltage.

It is a general object of the present invention to provide a novel self-triggered sawtooth voltage wave generator having a high degree of linearity and stability in repetition which utilizes a minimum of parts.

It is another object of the present invention to provide a sawtooth voltage wave generator having a high degree of versatility and adaptability to various applications.

Other objects and advantages of the present invention will become apparent as the description of the invention progresses with reference being made to the various figures of the accompanying drawings wherein:

FIGURE I shows the preferred embodiment of the invention and includes characteristic waveforms which may be found at various points in the circuit, FIGURE II shows the basic structure of the invention as it appears without the cathode follower tube, and FIGURE III shows the invention utilizing a variation in the connection of the cathode follower to the source of negative D.C. potential.

Referring now to FIGURE I of the drawing, there is shown a vacuum tube 1 which is a pentode having an anode coupled to a source of positive D.C. potential at terminal 30 through junction 2 in series with resistor 3, and having its cathode coupled through resistors 11 and 20 to a source of negative D.C. potential at terminal 31. Tube 1 has its control grid coupled to junction 8 which is coupled to the positive voltage terminal 30 through resistors 9 and 21. Junction 8 is also coupled to the negative voltage source through resistor 10. Tube 1 has a suppressor grid coupled to junction 12 which is coupled to ground 32 through resistor 13, to the source of the negative D.C. potential at terminal 31 through resistor 14, and to an optional input terminal 23 through coupling capacitor 22. Tube 1 has its screen grid coupled to junction 15 which is coupled to ground through resistor 16 and which is also coupled to the source of negative potential at 31 through resistor 17. Triode 4 has an anode coupled to the source of positive potential at 30 and a cathode coupled to junction 5 which is coupled through potentiometer 6 and resistor 20 to the source of negative potential at terminal 31. Tube 4 has its control grid coupled to the anode of tube 1 at junction 2. A selectable capacitor 7 is coupled between junction 5 and junction 8. An output terminal 18 for the self-triggered sawtooth voltage wave is coupled to the variable tap of potentiometer 6 and another output terminal 19 is connected to ground.

Operation

All exponential changes in potential described herein are due to time constants formed by combinations of capacitances, including the interelectrode capacitance of pentode 1 and the capacitance of capacitor 7, in series with resistances coupled between the voltage sources or to ground potential. With the filaments of vacuum tubes 1 and 4 operating correctly, application of the positive voltage at terminal 30 and the negative voltage at terminal 31 causes anode current to flow in tube 1 and anode potential of tube 1 to drop a small amount due to anode current flowing through resistor 3 for about half a microsecond until the timing capacitor 7 starts to charge. This small voltage drop of the anode is coupled to the control grid of tube 1 through the cathode follower tube 4 in series with capacitor 7 and it starts the "Miller-effect" which is the start of the negatively-going linear portion of the self-triggered sawtooth voltage wave, which occurs during self-charging of the capacitor 7 for a period of time in seconds approximating the product found by multiplying its capacity in farads times the ohms of resistance of resistors 9 and 21. The sawtooth voltage wave is generated between the anode of tube 1 and ground potential. For a shorter period of charging time for capacitor 7 a steeper slope of the linear portion of the sawtooth wave occurs and the repetition frequency of the invention is higher. When the capacitor 7 stores sufficient charge for the anode potential of tube 1 to drop near the potential level on its suppressor grid, the suppressor grid current flows slightly for a few microseconds causing the potential on the suppressor grid to fall exponentially to drop low enough with regard to the anode potential of tube 1 to cut its anode off, which occurs at the end of the linearly negatively-going portion of the sawtooth voltage wave. When the suppressor grid potential becomes low enough, the screen grid conducts suddenly to cut off the suppressor grid current and the suppressor grid potential rises a few volts exponentially, in a short time to its normal level set by its resistance voltage divider, while simultaneously the cathode of tube 1 potential rises sharply. When the anode current of tube 1 is cut off, the screen grid current flows suddenly, dropping its potential through resistor 16 from the potential coupled to it through its resistance voltage divider, and the screen grid potential drops in a few microseconds to a level set by the screen grid voltage divider. When the anode current of tube 1 is cut off, the anode voltage rises exponentially simultaneously with the changes in cathode, control grid and suppressor grid potentials of tube 1 within a very short time to a combination of respective potentials whereby anode current starts to flow at a precise instant of time. These events are due to the coordination of changes in potentials of cathode, suppressor grid, anode, and control grid all occurring at the same time during anode current cutoff, without external triggering means and the cycle of events and sequences as described hereinbefore is repeated in successive similar cycles. When the anode current starts to flow, screen grid current of tube 1 is cut off and screen grid potential rises exponentially in a short time to its normal level of potential set by its respective voltage divider.

In the circuit shown in FIGURE 1 the negative feedback voltage from the cathode of tube 4 is fed into the cathode circuit of the pentode to increase the amplitude of the sawtooth voltage wave output, and the resistor 20 can be made variable as shown to vary the amount of negative feedback voltage to control the rate and stability of repetition of the self-triggered sawtooth voltage waves. This also changes the slope of the voltage wave on the cathode of the pentode which occurs during the flow of anode current to a positive, zero or negative slope, while the slopes of the voltage waves on the control grid and suppressor grid remain more or less negative. The changing of the feedback voltage coupled into the cathode circuit also changes the shape and time duration per cycle of the self-triggered sawtooth voltage waves.

As an optional feature in the interest of increasing the operating life of the pentode and decreasing its change of characteristics which may otherwise result from tube aging over a period of time and also to keep the anode power well below its maximum tube rating without sacrificing significant power output from the cathode follower output device, the anode of pentode 1 can be coupled through resistor 3 to a separate source of positive potential of a lower level than the source at terminal 30. Of course in this instance the resistor 3 is no longer coupled to the positive source 30.

FIGURE 1 shows resistor 21 as a variable resistor and also shows that the capacitor 7 is so arranged that various values of capacitance can be selected. The purpose of this arrangement is so that the frequency of repetition of the sawtooth wave voltage generator can be varied over a continuous range from a low frequency of seconds per cycle to high frequencies of hundreds of thousands of cycles per second. The capacitor is useful to change the range of frequencies and the variable resistor is useful to change the repetition frequency within a range of frequencies.

Resistor 13 can be made variable to adjust the self-triggering stability for different anode voltages. Resistor 16 may be made variable and can be used to vary the self-triggering frequency and the shape of the rectangular pulse out of the screen grid.

Potentiometer 6 when used instead of a resistor at the location shown in FIGURE 1, is used merely to vary the amplitude of the output of the sawtooth voltage wave generator.

The capacitor 22 and input terminal 23 represent an optional feature and are useful in the event that it would be desirable to coordinate the self-triggering action of the sawtooth voltage generator with extremely weak signals obtained from some circuit outside of the invention. The circuit of the invention in this instance continues to be self-triggering but tends to follow the frequency of the signals introduced at terminal 23.

The invention provides a source of self-triggered pulses and rectangular waves in addition to and simultaneously with the sawtooth voltage wave. These waves can be picked off at the cathode of tube 1 and at the screen grid of tube 1.

FIGURE II shows the present invention in more fundamental and basic form. In FIGURE II and also in FIGURE III parts which correspond to parts shown in FIGURE I are designated by the same reference characters as used in FIGURE I. In the circuit shown in FIGURE II cathode follower tube 4 is omitted. Capacitor 7 directly connects the anode and grid of pentode 1 to each other. Output terminal 18 is directly connected to the anode of pentode 1. This circuit, while it operates according to the invention, is not so versatile or useful as the preferred embodiment shown in FIGURE I.

FIGURE III shows a variation of the arrangement of the output terminals 18 and 19 and the capacitor 7 and omits the variable resistor in the connection of the grid of the pentode 1 to the source of positive D.C. potential 30. It also shows that the cathode of the cathode follower tube 4 can be connected directly through resistor 6 to the source of negative D.C. potential 31. Again as in the case of FIGURE II the circuit of FIGURE III as shown is not as versatile as that of the preferred embodiment shown in FIGURE I. While FIGURES II and III show circuits not as versatile as that of FIGURE I they are somewhat simpler and may find a variety of applications.

While the circuits shown and described are representative of preferred and more characteristic embodiments of the present invention it is clear that other variations and embodiments may be made which would still be within the scope of the present invention and it is desired that the scope of the present invention be limited only by the following claim.

I claim:

A high frequency, fast recovering, self-triggering sawtooth voltage wave generating circuit comprising: a pentode generating tube having cathode, control grid, screen grid, suppressor grid, and anode electrodes; a source of positive direct current potential resistively coupled to said anode electrode of said pentode generating tube; a source of negative direct current potential coupled through an adjustable resistance in series with a fixed resistance to said cathode electrode of said pentode generating tube; a self-triggering grid control means consisting of separate first and second voltage dividers each having an adjustable resistance with one terminal thereof coupled to ground potential and the other terminal coupled via a respective fixed resistance to said source of negative direct current potential, said screen grid electrode being directly coupled to the junction of said adjustable resistance and said fixed resistance in said first voltage divider and said suppressor grid electrode being directly coupled to the junction of said adjustable resistance and said fixed resistance in said second voltage divider, said self-triggering grid control means being adjustable to establish a charge and discharge time sequence in accordance with the resistive impedance of said first and second voltage dividers and interelectrode capacitance to periodically initiate anode conduction; a triode output and coupling tube having cathode, control grid, and anode electrodes with said triode control grid electrode being directly coupled to said anode electrode of said pentode generating tube in order to utilize the amplification factor thereof and said triode anode electrode being coupled to said source of positive direct current potential; an output amplitude controlling potentiometer having one end of its fixed resistance coupled to said cathode electrode of said triode output and coupling tube and the other end thereof coupled to the junction point between said adjustable resistance and said fixed resistance in the cathode circuit of said pentode generating tube; a third voltage divider self-triggering grid control means consisting of an adjustable resistance and a fixed resistance coupled in series between said source of positive direct current potential and said source of negative direct current potential with said control grid of said pentode generating tube being coupled directly to the junction point of said adjustable resistance and said fixed resistance, this direct coupling enabling said generating circuit to have a very fast recovery time and a period in the order of a few microseconds; an adjustable capacitance having one terminal thereof coupled to the cathode electrode of said triode tube and the other terminal thereof coupled to said junction point of said third voltage divider self-triggering grid control means; and first and second output terminals for obtaining a sawtooth voltage output signal from said generating circuit, said first output terminal being coupled to a source of ground potential and said second output terminal being coupled to the movable tap of said potentiometer.

References Cited in the file of this patent

UNITED STATES PATENTS

| | | |
|---|---|---|
| 2,692,334 | Blumlein | Oct. 19, 1954 |
| 2,764,690 | Brumbaugh | Sept. 25, 1956 |
| 2,835,815 | Van Buren Cones | May 20, 1958 |